United States Patent
Yamamoto et al.

[11] Patent Number: 5,734,484
[45] Date of Patent: Mar. 31, 1998

[54] IMAGE PROCESSING APPARATUS FOR RECEIVING MULTICOLOR IMAGE INFORMATION AND GENERATING TWO-COLOR IMAGE INFORMATION

[75] Inventors: Masahito Yamamoto, Yokohama; Hideki Adachi, Kawasaki; Yoshiyuki Suzuki, Yokohama; Kazuhiko Hirooka, Tokyo; Hiroyuki Ichikawa, Kawasaki; Tetsuya Nozaki, Yokohama, all of Japan

[73] Assignee: Canon Kabushiki Kaisha, Tokyo, Japan

[21] Appl. No.: 143,643

[22] Filed: Nov. 1, 1993

[30] Foreign Application Priority Data

Nov. 5, 1992 [JP] Japan ................ 4-295919

[51] Int. Cl.⁶ .................. H04N 1/46; G03F 3/08; G06F 15/00
[52] U.S. Cl. .................. 358/500; 358/501; 358/515; 358/518; 358/530; 358/296; 382/163; 382/167; 395/109
[58] Field of Search ................ 358/500, 515, 358/518, 530, 501, 401, 296, 529; 382/163, 167; 395/109; 399/223

[56] References Cited

U.S. PATENT DOCUMENTS

| | | | |
|---|---|---|---|
| 4,554,241 | 11/1985 | Edwards et al. | 430/301 |
| 4,761,669 | 8/1988 | Langdon | 399/223 |
| 4,825,246 | 4/1989 | Fukuchi et al. | 358/515 |
| 4,847,654 | 7/1989 | Honma et al. | 358/300 |
| 4,873,570 | 10/1989 | Suzuki et al. | 358/515 |
| 4,903,048 | 2/1990 | Harrington | 358/298 |
| 4,907,078 | 3/1990 | Hasebe | 358/515 |
| 4,908,779 | 3/1990 | Iwata | 364/518 |
| 4,982,277 | 1/1991 | Katoh et al. | 358/520 |
| 4,996,591 | 2/1991 | Kadowaki et al. | 358/519 |
| 5,023,705 | 6/1991 | Kondo et al. | 358/518 |
| 5,057,914 | 10/1991 | Tsuji et al. | 358/530 |
| 5,138,443 | 8/1992 | Ikeda et al. | 358/518 |
| 5,206,719 | 4/1993 | Ikeda et al. | 358/518 |
| 5,267,031 | 11/1993 | Katoh et al. | 358/527 |

*Primary Examiner*—Edward L. Coles, Sr.
*Assistant Examiner*—Tia M. Harris
*Attorney, Agent, or Firm*—Fitzpatrick, Cella, Harper & Scinto

[57] ABSTRACT

When an original image of a full color is reconstructed by two colors, it is intended to prevent that a part of the original image is not reconstructed. An image of a full color original is read by a CCD, thereby forming signals of R, G and B. In an image processing unit, the R, G, and B signals are converted into red and black signals. The red and black signals are sent to a printer unit and an image is formed in red and black.

10 Claims, 4 Drawing Sheets

IMAGE PROCESSING APPARATUS FOR RECEIVING MULTICOLOR IMAGE INFORMATION AND GENERATING TWO-COLOR IMAGE INFORMATION

BACKGROUND OF THE INVENTION

1. Field of the Invention

The present invention relates to an image processing apparatus for receiving multicolor image information and generating two-color image information.

2. Related Background Art

In an image forming apparatus such as a digital copying apparatus or the like, there has been proposed an image forming apparatus in which an image of a color original is read by a photoelectric converting device such as a color CCD or the like, for example, a red component and a black component are separated from the read color image signal, and a color original image is reproduced in two different colors by forming images in a manner such that the image of the red component is formed in red and the image of the black component is formed in black.

In the above conventional apparatus such that regions are discriminated and images are formed in different colors, however, an effect can be expected with respect to a point that a character of red color can be reproduced in red for an original such that characters of the red color exist in a part of a black and white original. But, since the image is merely formed in a different color every region, such a method is improper for reproduction of a full-color original.

In an apparatus such that the image of the red component is formed in red and the image of the black component is formed in black, with respect to the portion containing only a large amount of complementary color (cyan) component of red on the original, both of the red component and the black component hardly appear as outputs, so that there is an inconvenience such that a part of the original image is not reconstructed (dropout color).

SUMMARY OF THE INVENTION

It is an object of the invention to provide an image processing apparatus which can solve the above problems.

Another object of the invention is to provide an image processing apparatus in which a multicolor image is received and separated into two desired color components and images of two colors are generated, wherein the complementary color component of a desired first color component is included in the second color component.

The above and other objects and features of the present invention will become apparent from the following detailed description and the appended claims with reference to the accompanying drawings.

DESCRIPTION OF THE PREFERRED EMBODIMENT

Figure 1:
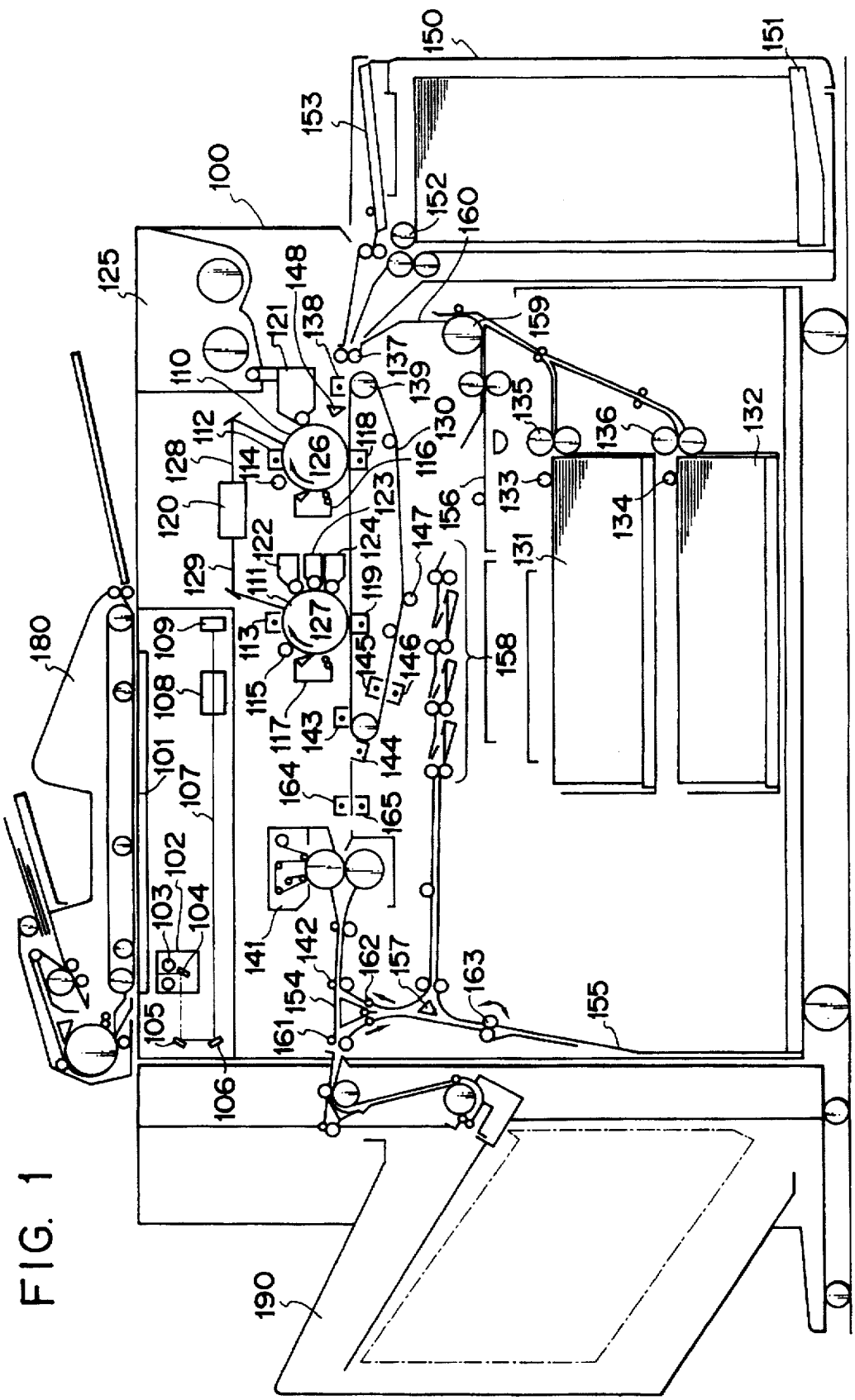
FIG. 1 is a cross sectional constructional view of an image forming apparatus of an embodiment of the invention.

FIG. 1 is a cross sectional constructional diagram for explaining an example of an image forming apparatus of the invention. In FIG. 1, reference numeral 100 denotes a copying apparatus main body; 180 a recyclic automatic document feeder (hereinafter, referred to as an RDF) to automatically feed an original; and 190 a sorter as a sorting apparatus. The RDF 180 and the sorter 190 can be freely combined with the main body and used.

The operation of the image forming apparatus of the embodiment will now be described hereinbelow.

In FIG. 1, reference numeral 101 denotes an original supporting glass as an original placing base plate and 102 indicates a scanner which is constructed by an original illuminating lamp 103, a scanning mirror 104, and the like. The scanner is reciprocated and scanned in a predetermined direction by a motor (not shown). The reflected light of the original is transmitted in a lens 108 through scanning mirrors 104 to 106, so that an image is formed on a CCD sensor 109.

Reference numeral 107 denotes an exposure control unit constructed by a laser, a polygon scanner, and the like. Laser beams 128 and 129 modulated on the basis of an image signal which had been subjected to a predetermined image process, which will be explained hereinlater, are irradiated to photosensitive drums 110 and 111.

A primary charging device 112, a black developing device 121, a copy transfer charging device 118, a cleaning apparatus 116, and a pre-exposing lamp 142 are arranged around the photosensitive drum 110. A primary charging device 113, a red developing device 122, a blue developing device 123, a green developing device 124, a copy transfer charging device 119, a cleaning apparatus 117, and a pre-exposing lamp 115 are arranged around the photosensitive drum 111. Either one of the developing devices 122 to 124 is arranged near the photosensitive drum 111 by a developing device switching apparatus (not shown) and the other remaining developing devices are located at remote positions. A black image forming unit 126 is constructed by the above photosensitive drum 110 and the like. A color image forming unit 127 is constructed by the above photosensitive drum 111 and the like.

In the black image forming unit 126, the photosensitive drum 110 is rotated in the direction indicated by an arrow shown in the diagram by a motor (not shown). After the drum 110 was charged to a desired potential by the primary charging device 112, the laser beam 128 from an exposure control unit 120 is irradiated, so that an electrostatic latent image is formed. The electrostatic latent image formed on the drum 110 is developed by a black developing device 121 and is visualized as a toner image. On the other hand, a copy transfer paper is picked up from an upper stage cassette 131 or a lower stage cassette 132 by pickup rollers 133 and 134 and is fed. The copy transfer paper is conveyed into the apparatus main body by paper feed rollers 135 and 136 and is further conveyed to a copy transfer belt by a registration roller 137. The visible toner image is copy transferred onto the copy transfer paper by the copy transfer charging device 118. A remaining toner on the photosensitive drum after completion of the copy transfer is cleaned by the cleaning apparatus 116 and the residual charges are erased by the pre-exposing lamp 114.

The toner image which was visualized by the desired developing device is copy transferred onto the copy transfer paper by the color image forming unit 127 by the operations similar to those mentioned above.

The copy transfer paper after completion of the copy transfer is peeled off from a copy transfer belt 130. The toner image is again charged by prefixing charging devices 164 and 165, which will be explained hereinlater. The copy transfer paper is sent to a fixing device 141 and the toner image on the paper is fixed by applying a pressure to the paper and by heating the paper. After that, the paper is delivered to the outside of the apparatus main body 100 by a delivery roller 142.

Reference numeral 138 denotes an adsorption charging device to adsorb the copy transfer paper from the registration roller to the copy transfer belt 130. Reference numeral 139 denotes a copy transfer belt roller which is used to rotate the copy transfer belt 130 and is also used to adsorb and charge the copy transfer paper to the belt 130 by functioning together with the adsorption charging device 138 as a pair.

Reference numeral 143 denotes a discharging device for enabling the copy transfer paper to be easily separated from the belt 130; 144 indicates a peel-off charging device to prevent a fluctuation of an image due to the peel-off discharge when the copy transfer paper is separated from the belt 130; 164 and 165 the pre-fixing charging devices for compensating an adsorbing force of the toner on the copy transfer paper after it is separated and for preventing the image fluctuation; 145 and 146 copy transfer belt discharging device for discharging the copy transfer belt 130 and for electrostatically initializing the belt 130; and 147 a belt cleaner for eliminating a dirt of the belt 130.

Reference numeral 148 denotes a paper sensor to detect a front edge of the copy transfer paper fed onto the belt 130. A detection signal of the paper sensor 148 is used as a sync signal in the paper feeding direction (sub-scanning direction).

A deck 150 which can enclose, for example, 4000 copy transfer papers is installed in the main body 100. A lifter 151 of the deck 150 is lifted up in accordance with an amount of copy transfer papers so that the top one of the copy transfer papers is always come into contact with a paper feed roller 152. A multi hand insertion tray 153 which can enclose 100 copy transfer papers is provided for the main body.

In FIG. 1, further, reference numeral 154 denotes a paper delivery flapper to switch the path on the both-sided recording side or multiplex recording side and the delivery side (sorter 190). The copy transfer paper sent out from the delivery roller 142 is switched to the both-sided recording side or multiplex recording side by the delivery flapper 154. Reference numeral 158 denotes a lower conveying path. The copy transfer paper sent out from the delivery roller 142 is reversed upside down through a reversing path 155 and is led to a paper refeed tray 156 by the lower conveying path 158. Reference numeral 157 denotes a multiplex flapper for switching the path in the both-sided recording mode and the path in the multiplex recording mode. By inclining the flapper 157 to the left, the paper is directly led to the lower conveying path 158 without passing through the reversing path 155. Reference numeral 159 denotes a paper feed roller to feed the copy transfer paper to the photosensitive drum 126 side through a path 160. Reference numeral 161 denotes a delivery roller which is arranged near the delivery flapper 154 and is used to deliver the copy transfer paper which was switched to the delivery side by the flapper 154 to the outside of the apparatus main body. In the both-sided recording (both-sided copying) mode or the multiplex recording (multiplex copying) mode, the delivery flapper 154 is lifted up and the copy transfer paper after completion of the copy transfer is conveyed along the conveying paths 155 and 158 and stored onto the paper refeed tray 156 in a reversed upside-down state. In this instance, in the both-sided recording mode, the multiplex flapper 157 is inclined to the right. In the multiplex recording mode, the copy transfer papers stored on the paper refeed tray 156 are picked up one by one from the bottom and are led to the registration roller 137 of the main body by the paper feed roller 159 through the path 160.

When the copy transfer paper is reversed and delivered from the main body, the delivery flapper 154 is lifted up, the flapper 157 is inclined to the right, and the copy transfer paper after completion of the copy transfer is conveyed to the conveying path 155 side. After the rear edge of the copy transfer paper passed through a first feed roller 162, the paper is conveyed to a second feed roller side by a reversing roller 163. The copy transfer paper is reversed upside down and delivered to the outside of the apparatus by the delivery roller 161.

Figure 2:
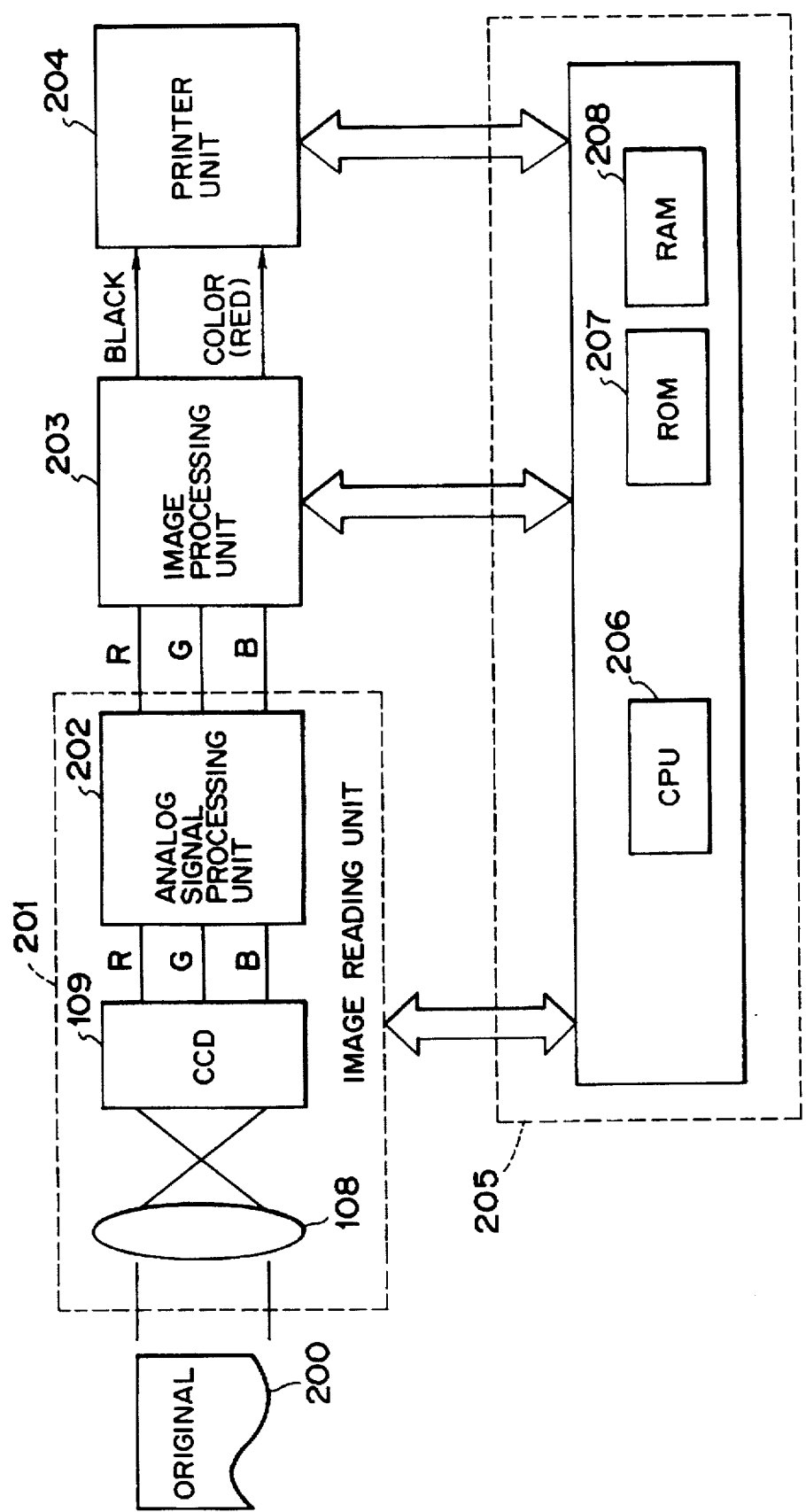
FIG. 2 is a block diagram of the image forming apparatus.

FIG. 2 shows a block diagram of an image forming apparatus of the invention.

An image reading unit 201 is constructed by the CCD sensor 109, an analog signal processing unit 202, and the like. The original image formed on the CCD sensor 109 through the lens 108 is converted into analog electric signals of R (Red), G (Green), and B (Blue) by the CCD sensor 109, respectively. The converted image information is supplied to the analog signal processing unit and subjected to a sampling and holding process, a correction of the dark level, and the like every color of R, G, and B. After that, the analog electric image signals are converted into the digital signals (A/D conversion) and the digital full color signals are supplied to an image processing section 203.

Correcting processes such as shading correction, color correction, γ (gamma) correction, and the like which are necessary for the reading system, a smoothing process, an edge emphasis, other processes, and the like are executed in the image processing section 203. The processed signals are supplied to a printer unit 204.

The printer unit 204 is constructed by the exposure control unit 120 comprising the laser and the like, the image forming units 126 and 127, the conveyance control unit of the copy transfer paper, and the like which have already been described with reference to the cross sectional constructional diagram of FIG. 1. The printer unit 204 records the image on the copy transfer paper by the input image signal.

A CPU circuit unit 205 is constructed by a CPU 206, an ROM 207, an RAM 208, and the like and controls the image reading unit 201, image processing unit 203, printer unit 204, and the like and integratedly controls a sequence of the apparatus.

The image processing unit 203 will now be described.

Figure 3:
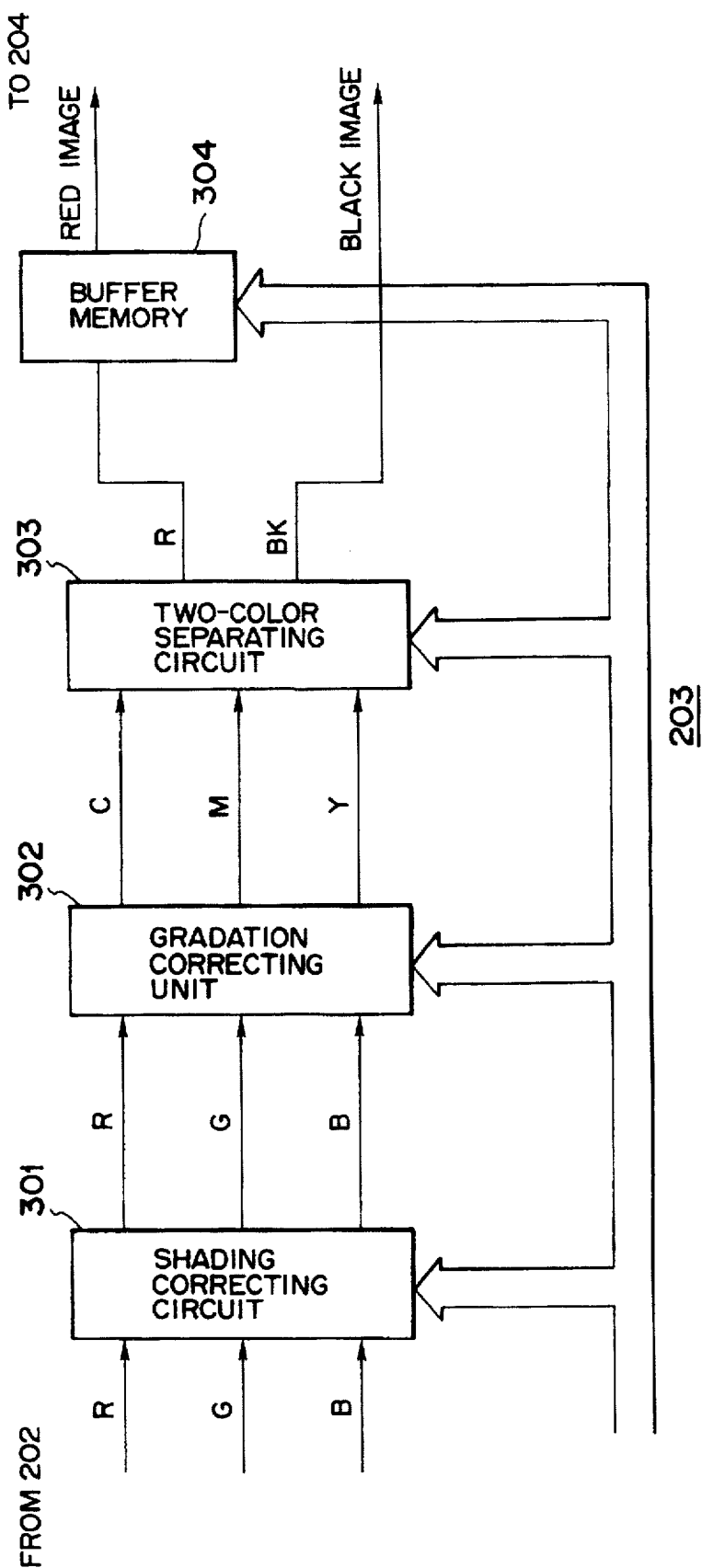
FIG. 3 is a block diagram of an image processing unit 203.

FIG. 3 is a constructional block diagram of the image processing unit 203.

Figure 4:
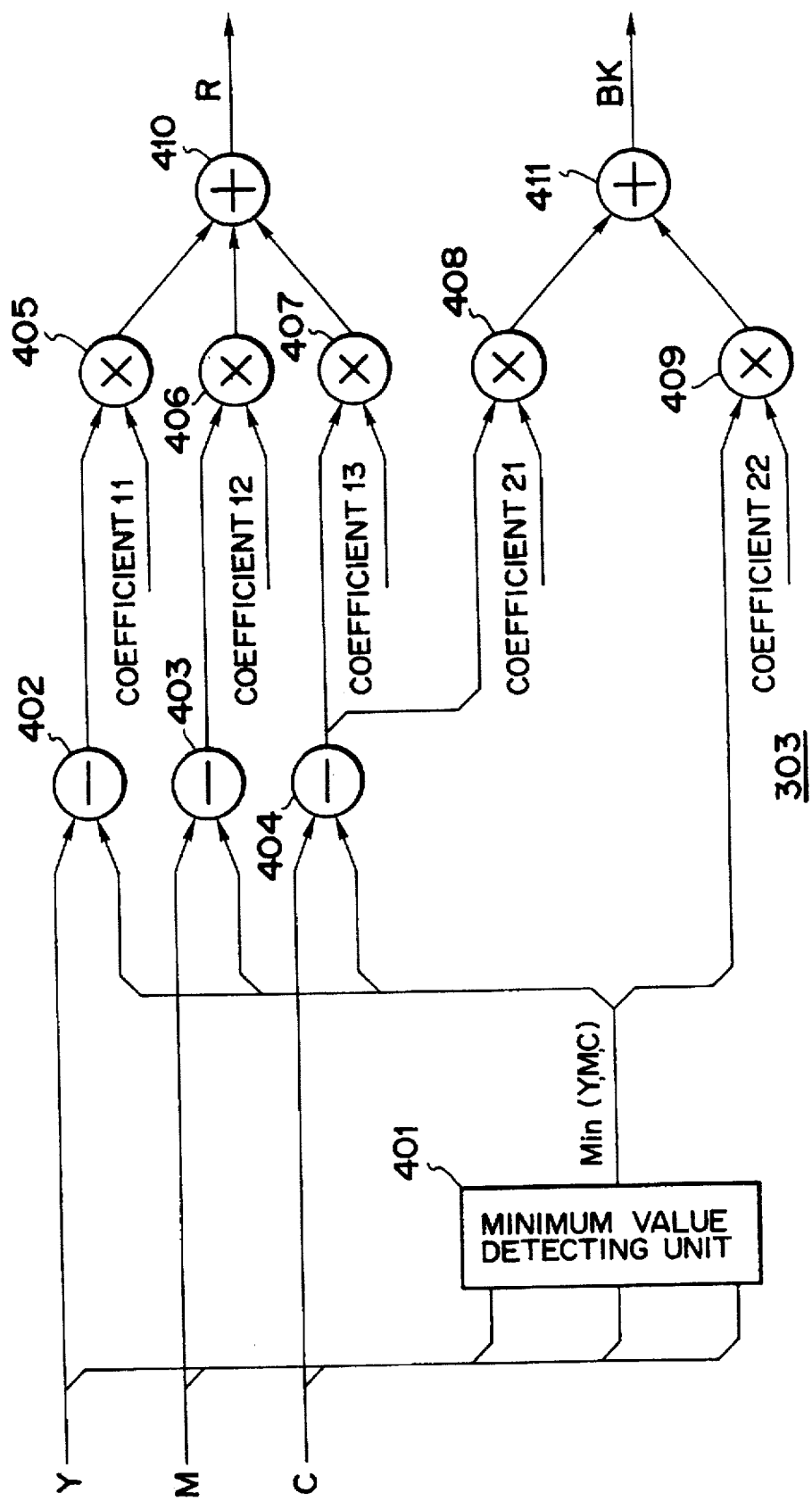
FIG. 4 is a block diagram of a two-color separating circuit 303.

The digital image signal from the analog signal processing unit 202 in FIG. 2 is subsequently sent to a shading correcting circuit 301. The shading correcting circuit 301 corrects a sensitivity variation of the sensor to read the original image and light distributing characteristics of a lamp to illuminate the original. The corrected image signals are supplied to a gradation correcting unit 302 for converting from a luminance signal into a density signal. The luminance signals R (red), G (green), and B (blue) signals received are logarithm converted by the gradation correcting unit 302 into the density signals C (cyan), M (magenta), and Y (yellow) of complementary colors of RGB. The image signals converted into the density signals are supplied to a two-color separating circuit 303. FIG. 4 is a diagram showing a construction of the two-color separating circuit 303. The two-color separating circuit 303 produces the image data of red and black as toner colors of the printer unit from the density signals C (cyan), M (magenta), and Y (yellow). The received density signals are sent to a minimum value detecting unit 401, by which the minimum value among three colors, namely, the signal of the highest density is detected. The signal of Min (Y, M, C) detected is subtracted from the imputted density signals of Y, M, and C by subtracters 402, 403, and 404, respectively. The above processes are similar to an undercolor removing process (UCR) which is generally executed in a color scanner or the like. The signals of red (R) and black (BK) are formed by using those signals. First, the formation of the red image will now be described. The color density signals subtracted by the subtracters 402, 403, and 404 are multiplied with coefficients (coefficient 11, coefficient 12, coefficient 13) which have previously been obtained by calculations by multipliers 405, 406, and 407, respectively. The results of the multiplications are subsequently added by an adder 410 and the result is outputted as red image data (R).

A black image will now be formed. The minimum value Min (Y, M, C) is subtracted from the cyan data by the subtracter 404. The result of the subtraction is supplied to the multiplier 407 and also to a multiplier 408. An output signal from the above minimum value detecting unit 401 is supplied to a multiplier 409. The multipliers 408 and 409 multiply preset coefficients (coefficient 21, coefficient 22). The multiplied signals are added by an adder 411 and, after that, the result is outputted as a black image signal (BK). That is, the following arithmetic operations are executed (* indicates the multiplication).

Red image $(R)$ = coefficient 11 * $(Y - Min(YMC))$ +
 coefficient 12 * $(M - Min(YCM))$ +
 coefficient 13 * $(C - Min(YCM))$
Black image $(BK)$ = coefficient 22 * $Min(YCM)$ +
 coefficient 21 * $(C - Min(YCM))$ Those arithmetic operations are executed and the black image signal generated from the two-color separating circuit 303 is sent to the printer unit. The red image signal is delayed by a predetermined time by a buffer memory 304. This is because such a delay is performed to compensate the physical positional deviation of the photosensitive drums 111 and 110 to expose the red image and black image. The red image data is delayed by the predetermined time by the buffer memory and, after that, the delayed data is sent to the printer unit 204. An exposure control unit 120 generates laser beams according to the red image and black image and irradiates onto the photosensitive drums 111 and 110, respectively. As mentioned above, a color image is reproduced by the red and black colors.

In the image forming apparatus in which the color image is received and is color divided into two desired color components and an image is formed in two colors as mentioned above, the complementary color component of the desired first color component is included in the second color component. Therefore, it is prevented that the portion including a large amount of only the complementary color component of the first color on the original image is not reconstructed. A good image without a dropout color can be formed.

The invention is not limited to the copying apparatus of the electrophotographic system of the embodiment but can be also applied to any other copying apparatus of the ink jet system of two colors, thermal recording system, or thermal copy transfer recording system or can be also applied to a printer connected to a reader, a computer, a facsimile, or the like.

The invention is not limited to the image processes constructed by the hardware as in the embodiment but the image processes can be also executed by a software. Such a software can be previously stored into an ROM in the image forming apparatus or an IC card inserted or can be also loaded into an RAM or hard disc in the apparatus from a floppy disk, a magnetic tape, or the like.

What is claimed is:

1. A color image processing apparatus comprising:

input means for inputting color image data comprised of N (N≧3) color components; and converting means for converting the color image data into output color image data comprised of first and second color components;

wherein said converting means comprises:

generating means for generating monochromatic color component data based on the N color components; and obtaining means for obtaining data relating to the second color component based on the monochromatic color component data and data relating to a color component corresponding to a complementary color of the first color component.

2. An apparatus according to claim 1, wherein the input means scans an original to generate the color image data.

3. An apparatus according to claim 1, wherein the N color components comprise Y, M and C color components.

4. An apparatus according to claim 1, wherein the first color component is R, and the color component corresponding to the complementary color of the first color component is C.

5. An apparatus according to claim 1, further comprising image forming means for forming an image via an electrophotographic method using two color recording materials based on the output color image data.

6. A color image processing apparatus for converting a color image into a two color image, the color image being represented by digital image data comprising information for N (N≧3) color components, the apparatus comprising:

inputting means for inputting the digital image data comprising information for N color components; and converting means for converting the digital image data comprising information for N color components into digital image data comprising information for two color components so that the color image is reproduced as a two color image having two color components in which generation of a dropout color has been suppressed, wherein the converting means comprises multipliers and adders.

7. An apparatus according to claim 6, wherein the two color image is formed on a recording medium using two recording materials on the basis of the digital image data comprising information for two color components.

8. An apparatus according to claim 6, wherein the input means scans an original to generate the digital image data comprising information for N color components.

9. An apparatus according to claim 6, wherein the information for two color components includes achromatic color component information.

10. A color image processing method comprising the steps of:

inputting color image data comprised of N (N≧3) color components; and converting the color image data into output color image data comprised of first and second color components;

wherein the converting step comprises the steps of:

generating monochromatic color component data based on the N color components; and obtaining data relating to the second color component based on the monochromatic color component data and data relating to a color component corresponding to a complementary color of the first color component.

* * * * *